United States Patent
Wang et al.

(10) Patent No.: US 11,194,612 B2
(45) Date of Patent: Dec. 7, 2021

(54) SELECTIVE CODE SEGMENT COMPILATION IN VIRTUAL MACHINE ENVIRONMENTS

(71) Applicant: INTERNATIONAL BUSINESS MACHINES CORPORATION, Armonk, NY (US)

(72) Inventors: Ting Wang, Shanghai (CN); Xiao Ping Guo, Shanghai (CN); Xiao Lei Hu, Shanghai (CN); Yang Liu, Shanghai (CN); Dan Liu, Shanghai (CN); Ning Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/525,881

(22) Filed: Jul. 30, 2019

(65) Prior Publication Data

US 2021/0034392 A1 Feb. 4, 2021

(51) Int. Cl.
*G06F 9/455* (2018.01)
*G06F 11/34* (2006.01)

(52) U.S. Cl.
CPC ...... *G06F 9/45558* (2013.01); *G06F 11/3495* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| 6,295,643 | B1 | 9/2001 | Brown | |
| 6,760,907 | B2* | 7/2004 | Shaylor | G06F 9/4491 717/158 |
| 6,922,782 | B1* | 7/2005 | Spyker | G06F 21/52 713/161 |
| 7,150,012 | B2* | 12/2006 | Hill | G06F 8/443 717/158 |
| 7,213,240 | B2* | 5/2007 | Wong | G06F 8/443 717/148 |
| 7,246,346 | B2* | 7/2007 | Demsey | G06F 9/45516 711/103 |

(Continued)

OTHER PUBLICATIONS

Franz et al "Making Mobile Code Both Safe and Efficient", 2003 IEEE, 20 pages.*

(Continued)

*Primary Examiner* — Van H Nguyen
(74) *Attorney, Agent, or Firm* — Rakesh Roy

(57) ABSTRACT

This disclosure provides a solution for improving performance in a virtual machine. In this method, a platform independent intermediate representation of a code segment in an application is obtained from a first virtual machine which is operating on a first platform. The platform independent intermediate representation is generated through a run-time compilation by the first virtual machine. Native code is generated based on the platform independent intermediate representation, in which at least one piece of the native code corresponds to a second platform which is different from the first platform. The at least one piece of the native code is distributed to a second virtual machine which is operating on the second platform.

17 Claims, 6 Drawing Sheets

(56) References Cited

U.S. PATENT DOCUMENTS

| | | | |
|---|---|---|---|
| 7,353,504 B2* | 4/2008 | Lagergren | G06F 8/4441 |
| | | | 717/136 |
| 8,286,152 B2 | 10/2012 | Grcevski | |
| 8,453,128 B2* | 5/2013 | Daynes | G06F 9/45516 |
| | | | 717/148 |
| 8,769,511 B2* | 7/2014 | Gal | G06F 9/45516 |
| | | | 717/148 |
| 9,983,857 B2* | 5/2018 | Powers | G06F 8/451 |
| 2004/0073904 A1* | 4/2004 | Hill | G06F 9/45516 |
| | | | 718/1 |
| 2020/0065124 A1* | 2/2020 | Chen | G06F 8/4441 |

OTHER PUBLICATIONS

Ellul et al "Run-time Compilation of Bytecode in Sensor Networks", 2010 IEEE, pp. 133-138.*

Debbabi et al "Accelerating Embedded Java for Mobile Devices", 2005 IEEE, pp. 80-85.*

Lion et al., "Don't Get Caught in the Cold, Warm-up Your JVM: Understand and Eliminate JVM Warm-up Overhead in Data-Parallel Systems", Proceedings of the 12th USENIX Symposium on Operating Systems Design and Implementation (OSDI '16). Nov. 2-4, 2016 • Savannah, GA, USA, https://www.usenix.org/conference/osdi16/technical-sessions/presentation/lion, pp. 383-400.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

SELECTIVE CODE SEGMENT COMPILATION IN VIRTUAL MACHINE ENVIRONMENTS

BACKGROUND

The present disclosure relates generally to data processing, and more specifically, to a method, a system and a computer program product for improving performance in a virtual machine.

Platform independent computing represents a modern advancement in computer science. Platform independent computing technologies such as the Java® (Java and all Java-based trademarks and logos are trademarks or registered trademarks of the Oracle Corporation and/or its affiliates) and C #computing languages and associated development tools allow software developers to develop a single set of source code for all destination computing platforms. To enable a platform independent application to execute on different types of data processing systems, typically a platform independent file format is generated, which can be interpreted at runtime in the destination platform utilizing a virtual machine for a platform specific runtime environment.

SUMMARY

According to one embodiment of the present invention, there is provided a computer-implemented method for improving performance in a virtual machine. In this method, a platform independent intermediate representation of a code segment in an application is obtained from a first virtual machine which is operating on a first platform. The platform independent intermediate representation is generated through a run-time compilation by the first virtual machine. Native code is generated based on the platform independent intermediate representation, in which at least one piece of the native code corresponds to a second platform which is different from the first platform. The at least one piece of the native code is distributed to a second virtual machine which is operating on the second platform.

Other embodiments and aspects, including but not limited to, computer systems and computer program products, are described in detail herein and are considered a part of the claimed invention.

These and other features and advantages of the present invention will be described, or will become apparent to those of ordinary skill in the art in view of, the following detailed description of the example embodiments of the present invention.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
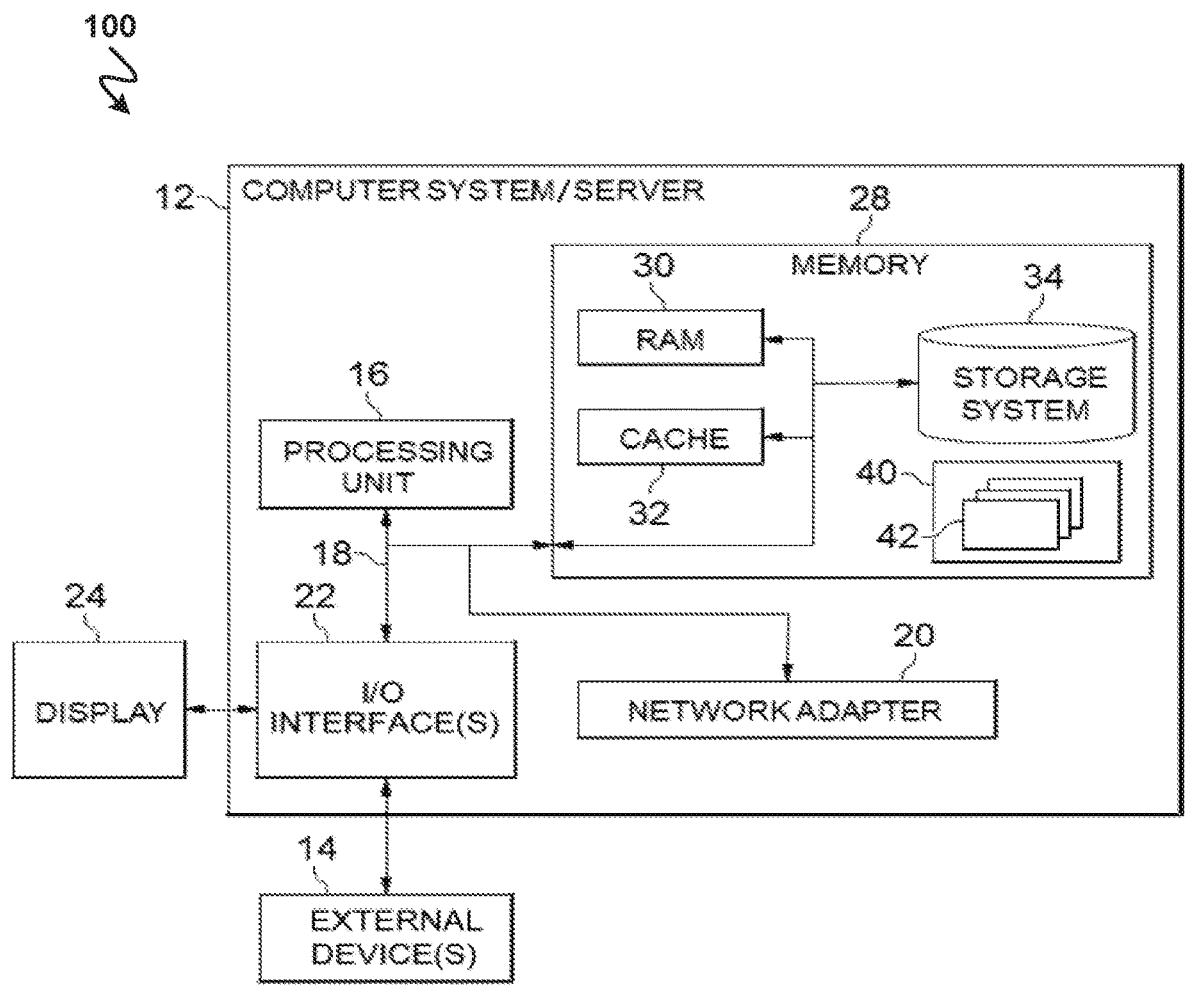
FIG. 1 depicts a cloud computing node according to an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
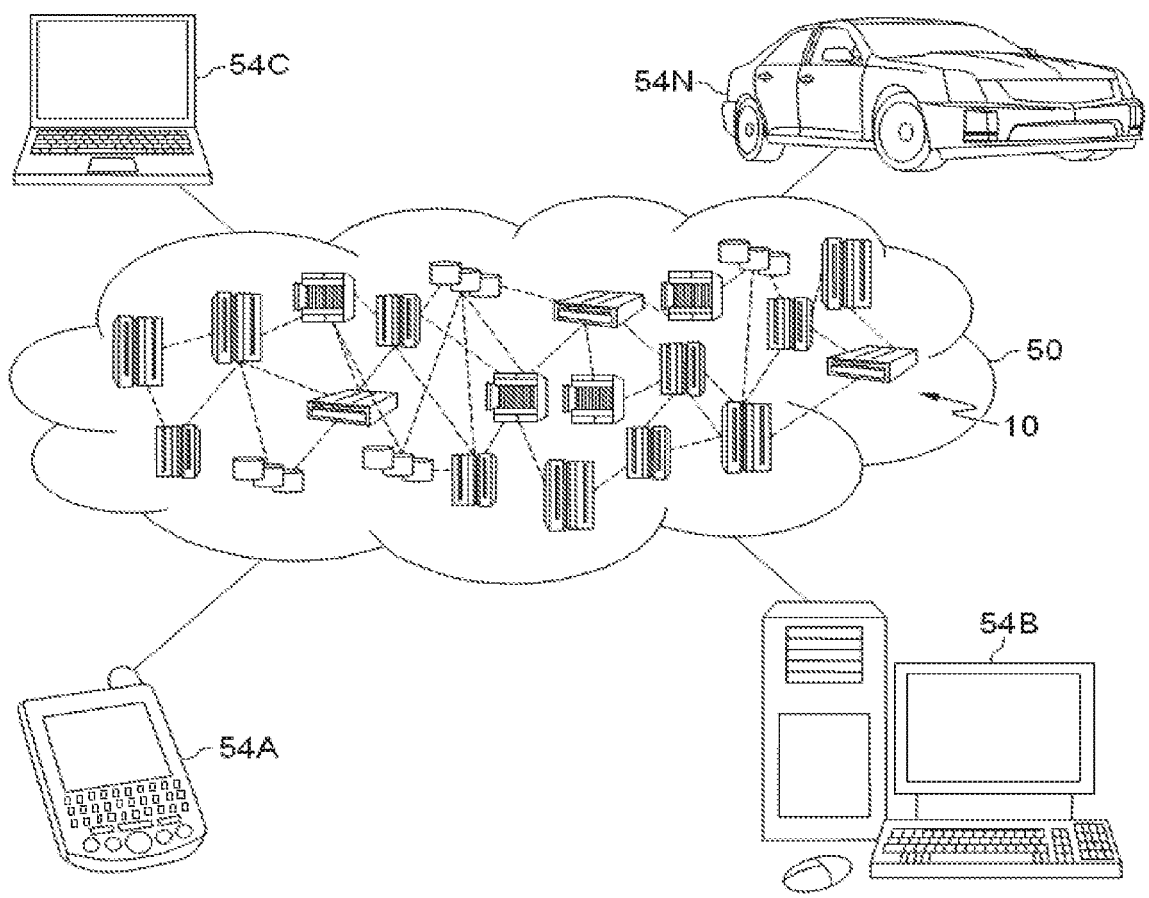
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
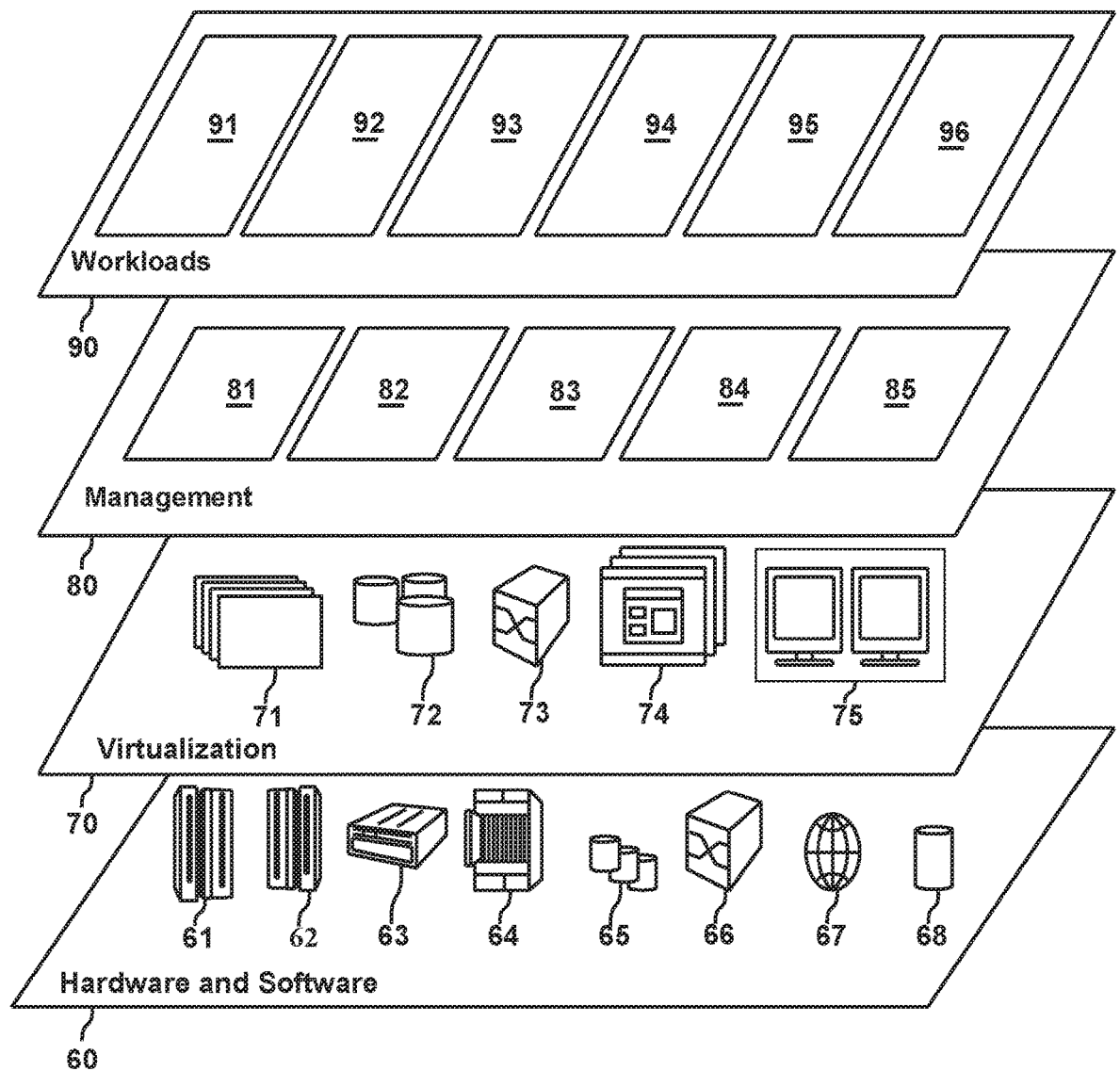
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual machine processing 96.

In a bytecode-compiled system, source code is translated to bytecode. Bytecode is not the machine code for any particular computer, and may be portable among computer architectures. The bytecode may then be interpreted by, or run on a virtual machine. The virtual machine interpreter performs the instruction-by-instruction translation into the machine language of the virtual machine, each resulting in multiple native instructions. Thus, interpreter performance is low.

To address the issue in the context of virtual machines, some machine implementations have been devised, such as Just-in-time (JIT) compilers, Dynamic Adaptive Compilation (DAC), etc. JIT compilation (also dynamic translation or run-time compilations) is a way of executing computer code that involves compilation during execution of a program—at run time—rather than prior to execution. Most often, this consists of source code or more commonly bytecode translation to machine code, which is then executed directly. A system implementing a JIT compiler typically continuously analyses the code being executed and identifies parts of the code where the speedup gained from compilation or recompilation would outweigh the overhead of compiling that code. The JIT compiler reads the bytecode in many sections and compiles them dynamically into machine code so the program can run faster. This can be done per-file, per-function or even on any arbitrary code fragment. The code can be compiled when it is about to be executed (hence the name "just-in-time" or "run-time"), and then cached and reused later without needing to be recompiled.

JIT would cause delay in initial execution of an application, due to the time taken to load and compile the bytecode. This delay may be called "startup time delay" or "warm-up time" or "overhead". In general, the more optimization a JIT compiler performs, the better the code the JIT compiler will generate, but the initial delay will also increase. A JIT compiler therefore has to make a trade-off between the compilation time and the quality of the machine code it hopes to generate.

Thus, it would be advantageous to have an improved way to allow the virtual machine to reduce virtual machine overhead while maintaining good performance by selectively compiling code segments.

Embodiments of the present invention propose a solution for optimizing execution of a code segment in an application by virtual machines. In general, a platform independent intermediate representation of a code segment in an application may be leveraged to generate native code suitable for a different platform and distributed to other virtual machines. Later, when the application in another virtual machine invokes the code segment and finds native code specific for another virtual machine's platform, the other virtual machine may execute the native code directly rather than compiling the code segment, thereby selectively compiling code segments. The overhead of JIT compilation would be reduced significantly. It is noted that the terms "application", "program", "program code", and other analogous terminology may be used interchangeably herein, and are used to broadly refer to any application or other program that can be executed by a virtual machine. The terms "run-time compilation", "just-in-time compilation", "JIT compilation" and other analogous terminology may be used interchangeably herein, and are used to broadly refer to a way of executing computer code that involves compilation during execution of a program—at run time—rather than prior to execution. And the term "code segment" may refer to a method, a function, a file, or any code fragment in an application.

For better understanding of the present invention, various embodiments are described below in connection with currently-known virtual machines that are implemented in software. A Java Virtual Machine (JVM) is used as a representative example of an architecture-neutral and portable language platform in which the principles of the present invention may be applied. However, it will be readily apparent to those skilled in the art from the description provided herein that the present invention is equally applicable to analogous programming and virtual machine technologies, whether existing currently or in the future. Therefore, references to Java, Java bytecode, JVMs, etc. are provided for purposes of illustration, and not of limitation.

Before introducing embodiments of the present invention, some terms are described as below.

Bytecode, also termed portable code or p-code, is a form of instruction set designed for efficient execution by a software interpreter. Bytecode may be output by programming language implementations to ease interpretation, or may be used to reduce hardware and operating system dependence by allowing the same code to run cross-platform, on different devices. Bytecode may often be either directly executed on a virtual machine (a p-code machine i.e., interpreter), or may be further compiled into machine code for better performance.

Machine code is a computer program written in machine language instructions that can be executed directly by a computer's central processing unit (CPU). Machine code is generally different from bytecode, which is either executed by an interpreter or the bytecode is compiled into machine code for faster (direct) execution. Machine code and assembly code are sometimes called native code when referring to platform-dependent parts of language features or libraries.

An intermediate representation (IR) is a data structure or code used internally by a compiler or virtual machine to represent source code. An IR is designed to be conducive for further processing, such as optimization and translation. A "good" IR would be accurate—capable of representing the source code without loss of information—and independent of any particular source or destination language. An IR may take one of several forms: an in-memory data structure, or a special tuple- or stack-based code readable by the program. In the latter case the IR is also called an intermediate language. Use of an intermediate representation allows compiler systems to be used by many different source languages to generate code for many different destination architectures.

Figure 4:
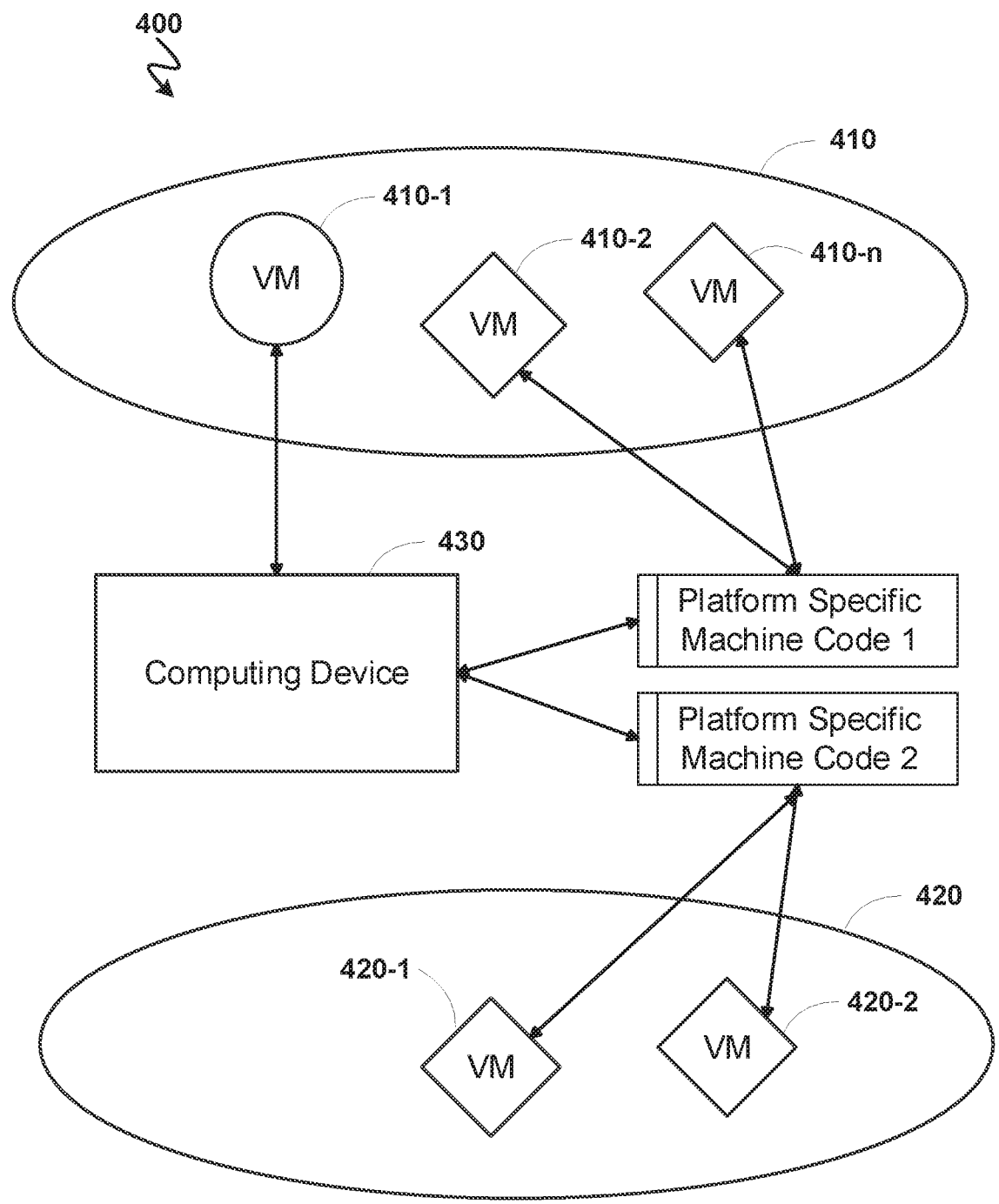
FIG. 4 depicts an environment in which a method according to embodiments of the present invention can be implemented.

Reference is first made to FIG. 4, which depicts an environment 400 in which a method according to embodiments of the present invention can be implemented.

As shown in FIG. 4, the environment 400 comprises a first node 410 and a second node 420. The first node 410 and the second node 420 may be physical machines or physical hosts with virtual machines running on them. The first node 410 is in a first platform and includes one or more virtual machines 410-1, 410-2, 410-n. The second node 420 is in a second platform which is different from the first platform and includes one or more virtual machines 420-1, 420-2.

In FIG. 4, the virtual machine 410-1 (herein referred as "source VM", represented as a circle in FIG. 4) is executing an application and the virtual machines 410-2, 410-3 in the first node 410, and the virtual machines 420-1, 420-2 in the second node 420 (herein referred as "destination VM" collectively, represented as a diamond in FIG. 4) are planning to execute the same application. With the solution according to embodiments of the present invention, the platform independent intermediate representation of a code segment in the application generated through a run-time compilation by the source VM may be leveraged to provide native code to be executed by the destination VM. According to embodiments of the present invention, the code segment may be a method, a file, a function, or any code fragment.

According to embodiments of the present invention, the environment 400 comprises a computing device 430. The computing device 430 may receive a platform independent intermediate representation of a code segment, for example, a method in an application generated through a run-time compilation by the source VM, and generate native code corresponding to different platforms based on the received intermediate representation. For example, the computing device 430 may generate platform specific machine code 1 of the method which corresponds to the first platform and generate platform specific machine code 2 of the method which corresponds to the second platform.

The generated platform specific machine code may be distributed to the first node 410 and the second node 420. Thus, when the destination VMs on the first node 410 and the second node 420 invoke the method for execution, the destination VMs may check to see whether there is native code for the method available. For example, if the virtual machine 420-1 finds that there is platform specific machine code 2 available, the virtual machine 420-1 may execute the platform specific machine code 2 directly. There is no need to run-time compile the method on the virtual machine 420-1, which may significantly reduce the overhead for run-time compilation on the destination virtual machine 420-1 on the second node 420. Similarly, if the virtual machine 410-2 finds that there is platform specific machine code 1 available, virtual machine 410-2 may execute the platform specific machine code 1 directly without run-time compilation of the method.

Figure 5:
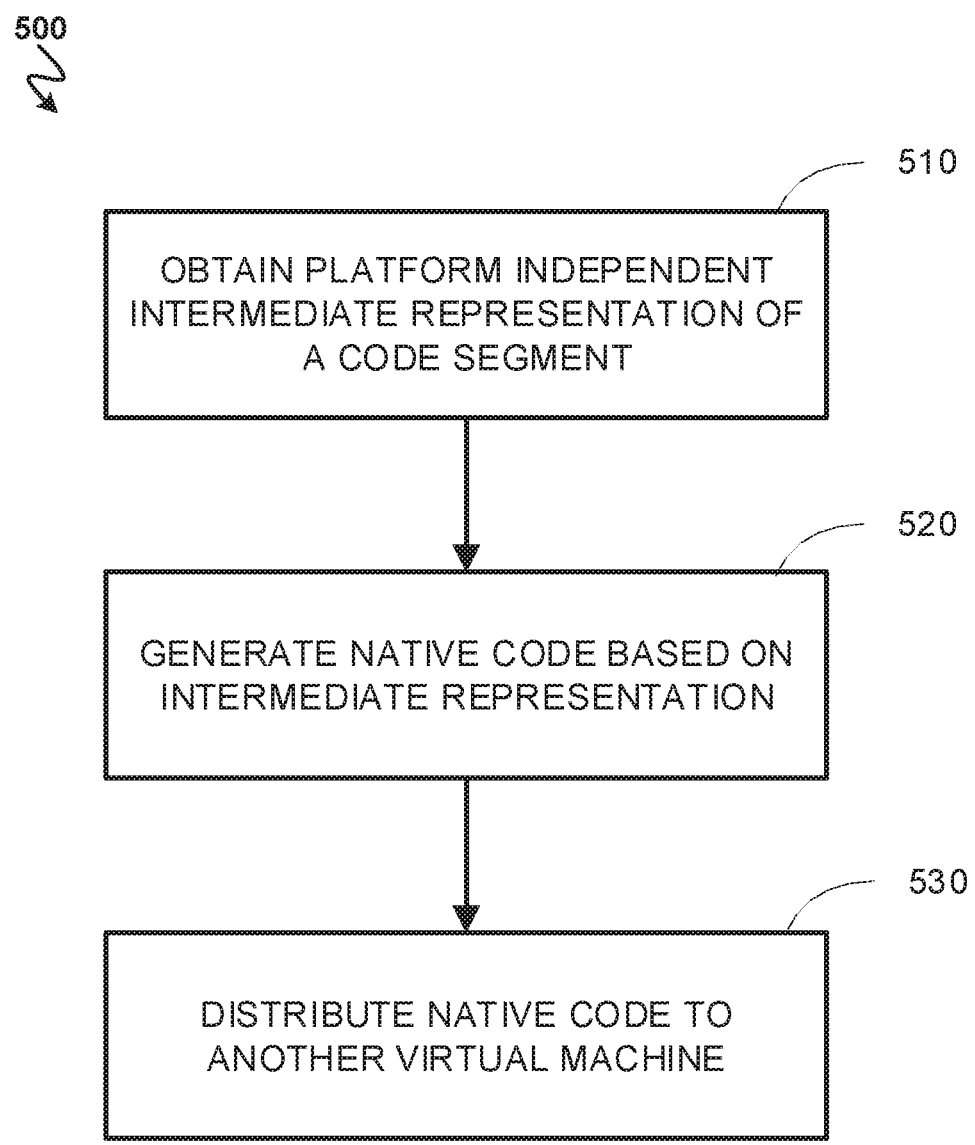
FIG. 5 illustrates a flowchart of a method for optimizing execution of an application according to an embodiment of the present invention.

FIG. 5 illustrates a flowchart of a method 500 for optimizing execution of a code segment in an application according to embodiments of the present invention. The method 500 can be implemented by the computing device 430 shown in FIG. 4. Acts involved in the method 500 will be described with reference to the environment 400 as shown in FIG. 4.

At block 510, the computing device 430 obtains a platform independent intermediate representation of a code segment from a source virtual machine. The intermediate representation of the code segment may be generated through the run-time compilation by the source virtual machine, for example, the virtual machine 410-1 in FIG. 4.

As described above, an intermediate representation is the data structure or code used internally by a compiler or virtual machine to represent source code. The platform independent intermediate representation may be used for further processing, such as optimization and translation, and may be independent of any particular source or destination language.

For example, a JIT compiler may be used in a JVM. The internal stages of Java JIT compiler can be divided into a platform independent part, High-Level Intermediate Representation (HLIR), and a platform dependent part, Low-Level Intermediate Representation (LLIR). The handling logic in HLIR is identical across all supported architectures, and the output from HLIR is fed to LLIR, the machine dependent part to generate native instructions. In this example, the platform independent intermediate representation of the code segment generated by the source virtual machine may be a HLIR.

At block 520, the computing device 430 generates native code based on the platform independent intermediate representation. The native code may include at least one piece of native code corresponding to a second platform which is different from the first platform. For example, the native code may include a piece of native code corresponding to first platform and a piece of native code corresponding to the second platform respectively. According to an embodiment of the present invention, the piece of the native code corresponding to the second platform may be identified with identification information of the code segment and the second platform.

As describe above, the platform independent intermediate representation of the code segment generated by the source virtual machine may be a HLIR. According to an embodiment of the present invention, a platform dependent intermediate representation of the code segment may be generated based on the platform independent intermediate representation obtained at block 510, and the platform dependent intermediate representation of the code segment is specific to the second platform. And then the computing device 430 generates at least one piece of native code corresponding to the second platform based on the platform dependent intermediate representation. According to an embodiment of the present invention, the platform dependent intermediate representation may be a LLIR in a JVM.

At block 530, the computing device 430 distributes the at least one piece of the native code to the second node 420 operating on the second platform. According to an embodiment of the present invention, the native code of the code segment may be distributed to other nodes as soon as the code segment is generated. According to another embodiment of the present invention, the native code of the code segment may be stored in the first virtual machine locally and distributed to the second virtual machine when the second virtual machine invokes the code segment. The native code of the code segment may also be stored in any one or more nodes in a node cluster.

Figure 6:
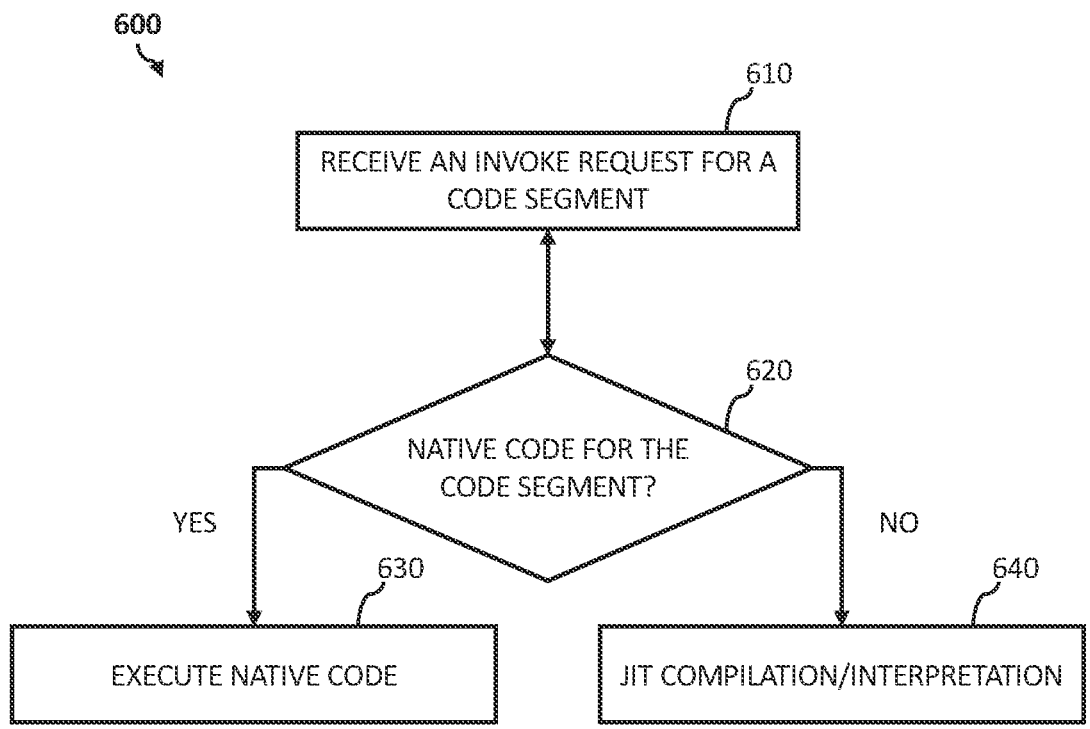
FIG. 6 illustrates a flowchart of a method for optimizing execution of an application according to another embodiment of the present invention.

FIG. 6 illustrates a flowchart of a method 600 for optimizing execution of an application according to another embodiment of the present invention. The method 600 can be implemented, for example, by a virtual machine 420-1 in the second node 420 shown in FIG. 4. Acts involved in the method 600 will be described with reference to the environment 400 as shown in FIG. 4.

With the method 500 described above, native code corresponding to the second platform would be generated and distributed to the second node 420 by the computing device 430. At block 610, the virtual machine 420-1 receives an invoke request for a code segment in an application. At block 620, the virtual machine 420-1 determines whether a piece of native code for the code segment is available, and obtain the piece of native code if it's available. According to an embodiment of the present invention, the virtual machine 420-1 may retrieve the native code corresponding to the second platform with the identification of the code segment and the second platform.

If the corresponding native code is found at block 620, at block 630, the virtual machine 420-1 executes the native code corresponding to the second platform. If there is no corresponding native code found at block 620, at block 640, the virtual machine 420-1 does JIT compilation or interpretation for the code segment.

According to an embodiment of the present invention, the native code may be shared among JVMs for running different instances of a same application. That is, the second virtual machine is running a different instance of the same application with the first virtual machine. The at least one piece of the native code is identified with identification information of the application, the code segment and the second platform. According to another embodiment of the present invention, the native code may also be shared among JVMs for running instances of different applications as long as the bytecode of the invoked code segment (for example, a method) is identical. Under such a situation, the native code may be identified with identification information of the code segment and the second platform.

For the destination virtual machines, since there is no need to compile the code segment before execution, the overhead of compilation would be reduced significantly.

Below an example will be described to illustrate how the implementation of the embodiments of the present invention may be used in a big data scenario.

Big data is a collection of large datasets that cannot be processed by traditional computing techniques. Some algorithms/approaches have been introduced to process big data. MapReduce is a well-known programming model and an associated implementation for processing and generating big data sets with a parallel, distributed algorithm on a cluster. MapReduce divides a task into small parts and assigns them to many JVMs. Later, the results from the JVMs are collected at one place and integrated to form the result dataset. Each map/reduce data block is executed by one standalone JVM. The JVM can be running on any CPU architecture (for example, x86, ppc641e, ARM etc.).

For some typical workload (application) in a large data center, for example, a HSDC (HyperScale Data Centers), there will be hundreds or thousands of JVMs during the map stage, and relatively less number of JVMs during the reduce stage. For purposes of the current example, the focus will be on map JVMs.

As we described above, JVM execution is based on bytecode instructions. Bytecode cannot be directly executed on any real-world CPU, so JVM needs some components to translate bytecode into CPU native instructions at runtime. Interpreter and JIT compiler are components that do the translation. JIT compilers may include a Client compiler and a Server compiler. Client compilers and Server compilers do translation on Java methods, generate machine code and load into code cache. The compilers have different characters. Client(C1) compiler does preliminary optimization and executes quickly. However, the quality of generated native instruction is relatively low. During C1 compilation, profiling logic is inserted into a method. Server(C2) compiler does aggressive optimization based on profiling information gathered by C1 methods and executes longer. Thus, the quality of generated native instruction is relatively high.

Among all the map JVMs, the interpreter does the bootstrap to execute application bytecode, meanwhile C1 generates native code for those Java methods within the reach of application execution. While C1 generated methods are being executed, invocation counters are incremented. C2 level compilation is triggered whenever method invocation counter exceeds some pre-defined threshold.

C2 compilation on any Java method is based on: (1) bytecode of the method, (2) profiling information regarding this method that is gathered from C1 method execution. For map JVMs within the same application, and regarding the same Java method that is being processed by C2 compilers, it is usually guaranteed that the bytecode of the method is identical across the JVMs. If the input data follows uniform distribution across the whole dataset, then there is a high probability that the profiling information regarding this method that is gathered from C1 method execution is also similar among the JVMs regarding the same Java method. Under such a situation (that is, input dataset following uniform distribution, same CPU architecture, same application, same method), C2 compilation output would also be identical.

Let us consider in one application there are J map JVMs, and there are about M C2 methods being compiled, and the average cost of compiling one C2 method is C. Then the total cost of C2 compilation regarding the application's map JVMs is J*M*C. With embodiments of the present invention, it's possible to reduce the total cost of C2 compilation regarding the application's map JVMs from J*M*C to close to M*C as much as possible.

To save the effort doing C2 compilation in a map JVM, a mechanism according to embodiments of the present invention is provided to share the result which is already being calculated inside some other map JVMs. Considering that HSDC may be composed of different CPU architectures, and the machine instructions loaded to different architectures are different by the nature, a computing device, named "transcoder" herein, may be introduced to translate the information among different CPU architectures.

Transcoder receives C2 methods in the form of HLIR, which may be represented by "A.M.HLIR". The prefix "A.M." denote that information belongs to a specific Application ("A") and a specific Java Method ("M"). Transcoder outputs machine code that can be directly loaded into corresponding JVM (per architecture).

Before doing C2 compilation, if JVM need to invoke a Java method "M" in an application "A", JVM looks up native code for the specific method "M" in the application "A", which would be identified by "A.M.Arch.MachineCode", in which "Arch" represents a specific Architecture, and "MachineCode" represents native code. If it is not found, C2 compilation may be started for the Java method "M" of this application "A". During C2 compilation process, "A.M.HLIR" is generated and exported out of source JVM, and sent to the transcoder. "A.M.HLIR" is processed by the transcoder, and machine code for different architectures "Arch" (represented by "A.M.Arch.MachineCode") are generated accordingly, and are pushed to all physical machines that have application JVMs running. If JVM founds "A.M.Arch.MachineCode" before doing C2 compilation, JVM directly loads that native code into code cache, and C2 compilation of that method can be avoided.

According to an embodiment of the present invention, the transcoder may have no affinity with any one of JVMs. The transcoder can be some central service installed in HSDC. According to an embodiment of the present invention, there may be multiple copies of A.M.HLIR presented to the transcoder. Transcoder can use any arbitrary algorithm to choose one (e.g., simply pick the first one) and ignore the rest duplicated copies for the same A.M.

Note that above reference to MapReduce is provided for purposes of illustration, and not of limitation. The embodiments of the present invention may be applicable to any appropriate big data processing implementations. Also, besides C2 compilation, the embodiments of the present invention may be applicable to C1 compilation and other dynamic compilation as well, including but not limited to Dynamic Adaptive Compilation, variations of Ahead-Of-Time (AOT) compilation, etc.

It should be noted that the processing of improving performance in a virtual machine (or achieved by system for improving performance in a virtual machine) according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

According to an embodiment of the present disclosure, there is provided a system, which may comprise one or more processors and a memory coupled to at least one of the one or more processors. The system may further comprise a set of computer program instructions stored in the memory and executed by at least one of the one or more processors in order to perform actions of estimating a value range of a water body parameter based on measured data for a water quality indicator of a first set of time-spatial points and measured data for the water quality indicator of a second set of time-spatial points; and determining an optimal value of the water body parameter from the estimated value range by comparing the measured data for the water quality indicator of the second set and simulated data for the water quality indicator of the second set, wherein the simulated data for the water quality indicator of the second set is obtained based on a fluid dynamic model using the measured data for the water quality indicator of the first set as an input of the fluid dynamic model and using a value in the estimated value range as a parameter of the fluid dynamic model.

According to an embodiment of the present disclosure, there is provided a computer program product. The computer program product may comprise a computer readable storage medium having program instructions embodied therewith. The program instructions may be executable by a device to perform a method. The method may comprise estimating a value range of a water body parameter based on measured data for a water quality indicator of a first set of time-spatial points and measured data for the water quality indicator of a second set of time-spatial points; and determining an optimal value of the water body parameter from the estimated value range by comparing the measured data for the water quality indicator of the second set and simulated data for the water quality indicator of the second set, wherein the simulated data for the water quality indicator of the second set is obtained based on a fluid dynamic model using the measured data for the water quality indicator of the first set as an input of the fluid dynamic model and using a value in the estimated value range as a parameter of the fluid dynamic model.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining, by a computing device, from a source virtual machine executing an application, a platform independent intermediate representation of a code segment in the application, the source virtual machine operating on a first platform, and the platform independent intermediate representation being generated through a run-time compilation by the source virtual machine;
    generating, by the computing device, a native code based on the platform independent intermediate representation, wherein at least one piece of the native code corresponds to a second platform which is different from the first platform; and
    in response to an invoke request for the code segment, distributing, by the computing device, to a destination virtual machine operating on the second platform, the at least one piece of the native code corresponding to the second platform, wherein the at least one piece of native code is configured to be executed by the destination virtual machine for executing the application.

2. The computer-implemented method of claim 1, wherein generating the native code based on the platform independent intermediate representation comprises:
    generating a platform dependent intermediate representation of the code segment based on the platform independent intermediate representation, the platform dependent intermediate representation being specific to the second platform; and
    generating the at least one piece of the native code based on the platform dependent intermediate representation.

3. The computer-implemented method of claim 1, wherein the destination virtual machine is running a different instance of a same application running on the source virtual machine.

4. The computer-implemented method of claim 1, wherein the at least one piece of the native code is identified with identification information of the code segment and the second platform.

5. The computer-implemented method of claim 1, wherein the source virtual machine and the destination virtual machine are Java virtual machines, and the platform independent intermediate representation is a high-level intermediate representation generated by the source virtual machine.

6. The computer-implemented method of claim 1, wherein obtaining, by the destination virtual machine, the at least one piece of the native code corresponding to the second platform includes:
    retrieving, by the destination virtual machine, the at least one piece of the native code corresponding to the second platform with identification information of the code segment and the second platform.

7. A computer system comprising:
    one or more processors;
    a memory coupled to at least one of the one or more processors;
    a set of computer program instructions stored in the memory and executed by at least one of the one or more processors in order to perform actions of:
    obtaining, by a computing device, from a source virtual machine executing an application, a platform independent intermediate representation of a code segment in the application, the source virtual machine operating on a first platform, and the platform independent intermediate representation being generated through a run-time compilation by the source virtual machine;
    generating, by the computing device, a native code based on the platform independent intermediate representation, wherein at least one piece of the native code corresponds to a second platform which is different from the first platform; and
    in response to an invoke request for the code segment, distributing, by the computing device, to a destination virtual machine operating on the second platform, the at least one piece of the native code corresponding to the second platform, wherein the at least one piece of native code is configured to be executed by the destination virtual machine for executing the application.

8. The computer system of claim 7, wherein generating the native code based on the platform independent intermediate representation comprises:
    generating a platform dependent intermediate representation of the code segment based on the platform independent intermediate representation, the platform dependent intermediate representation being specific to the second platform; and
    generating the at least one piece of the native code based on the platform dependent intermediate representation.

9. The computer system of claim 7, wherein the destination virtual machine is running a different instance of a same application running on the source virtual machine.

10. The computer system of claim 7, wherein the at least one piece of the native code is identified with identification information of the code segment and the second platform.

11. The computer system of claim 7, wherein the source virtual machine and the destination virtual machine are Java virtual machines, and the platform independent intermediate representation is a high-level intermediate representation generated by the source virtual machine.

12. The computer system of claim 11, wherein obtaining, by the destination virtual machine, the at least one piece of the native code corresponding to the second platform includes:
    retrieving, by the destination virtual machine, the at least one piece of the native code corresponding to the second platform with identification information of the code segment and the second platform.

13. A computer program product comprising a computer readable storage medium having program instructions embodied therewith, wherein the program instructions being executable by a device to perform a method comprising:
    obtaining, by a computing device, from a source virtual machine executing an application, a platform independent intermediate representation of a code segment in the application, the source virtual machine operating on a first platform, and the platform independent intermediate representation being generated through a run-time compilation by the source virtual machine;

generating, by the computing device, a native code based on the platform independent intermediate representation, wherein at least one piece of the native code corresponds to a second platform which is different from the first platform; and in response to an invoke request for the code segment, distributing, by the computing device, to a destination virtual machine operating on the second platform, the at least one piece of the native code corresponding to the second platform, wherein the at least one piece of native code is configured to be executed by the destination virtual machine for executing the application.

14. The computer program product of claim 13, wherein generating the native code based on the platform independent intermediate representation comprises:

generating a platform dependent intermediate representation of the code segment based on the platform independent intermediate representation, the platform dependent intermediate representation being specific to the second platform; and generating the at least one piece of the native code based on the platform dependent intermediate representation.

15. The computer program product of claim 13, wherein the destination virtual machine is running a different instance a same application running on the source virtual machine.

16. The computer program product of claim 13, wherein the at least one piece of the native code is identified with identification information of the code segment and the second platform.

17. The computer program product of claim 13, wherein the source virtual machine and the destination virtual machine are Java virtual machines, and the platform independent intermediate representation is a high-level intermediate representation generated by the source virtual machine.

* * * * *